(12) United States Patent  (10) Patent No.: US 8,054,848 B2
Cardona et al.  (45) Date of Patent: Nov. 8, 2011

(54) SINGLE DMA TRANSFERS FROM DEVICE DRIVERS TO NETWORK ADAPTERS

(75) Inventors: Omar Cardona, Cedar Park, TX (US); James B. Cunningham, Austin, TX (US); Baltazar De Leon, III, Austin, TX (US); Jeffrey P. Messing, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 12/468,741

(22) Filed: May 19, 2009

(65) Prior Publication Data

US 2010/0296518 A1  Nov. 25, 2010

(51) Int. Cl.
*H04L 12/28* (2006.01)
(52) U.S. Cl. ......... 370/412; 370/463; 709/212; 709/245
(58) Field of Classification Search .................. 370/389, 370/392, 394, 412, 463; 709/212, 238, 245, 709/250
See application file for complete search history.

(56) References Cited

U.S. PATENT DOCUMENTS

| | | | |
|---|---|---|---|
| 6,775,693 B1 * | 8/2004 | Adams | 709/213 |
| 7,356,039 B1 | 4/2008 | DiMambro | |
| 2002/0091844 A1 * | 7/2002 | Craft et al. | 709/230 |
| 2003/0231657 A1 | 12/2003 | Poon et al. | |
| 2003/0231659 A1 | 12/2003 | DeMambro | |
| 2004/0015598 A1 * | 1/2004 | Lin | 709/232 |
| 2004/0064590 A1 * | 4/2004 | Starr et al. | 709/250 |
| 2005/0108518 A1 * | 5/2005 | Pandya | 713/151 |
| 2005/0135395 A1 | 6/2005 | Fan et al. | |
| 2008/0126553 A1 * | 5/2008 | Boucher et al. | 709/230 |
| 2008/0240111 A1 * | 10/2008 | Gadelrab | 370/395.7 |
| 2008/0291933 A1 * | 11/2008 | Cardona et al. | 370/412 |

* cited by examiner

*Primary Examiner* — Jung Park
(74) *Attorney, Agent, or Firm* — Francis Lammes; Stephen J. Walder, Jr.; Jill A. Poimboeuf

(57) ABSTRACT

Methods and arrangements of data communications are discussed. Embodiments include transformations, code, state machines or other logic to provide data communications. An embodiment may involve receiving from a protocol stack a request for a buffer to hold data. The data may consist of all or part of a payload of a packet. The embodiment may also involve allocating space in a buffer for the data and for a header of a packet. The protocol stack may store the data in a portion of the buffer and hand down the buffer to a network device driver. The embodiment may also involve the network device driver transferring the entire packet from the buffer to a communications adapter in a single direct memory access (DMA) operation.

17 Claims, 6 Drawing Sheets

SINGLE DMA TRANSFERS FROM DEVICE DRIVERS TO NETWORK ADAPTERS

BACKGROUND

Data to be transmitted over a network typically is sent from an application to the protocol stack, a series of programs to transform the data in accordance with the standards for network transmissions. The data may be transformed into packets—small portions of the data with added headers. The protocol stack may turn over the packets to a network device driver. It, in turn, may transfer the packets to a communications adapter, a device providing an interface between a computing device and a communications link such as Ethernet cable.

A packet handed down to a network device driver by the protocol stack is typically composed of several linked buffers. These buffers include one or more header buffers, containing the network layer headers, and one or more payload buffers containing user data. To send a packet from the network device driver to the network adapter by direct memory access (DMA), the network device driver may either dynamically DMA map all the buffers or copy all the buffer pieces into a pre-mapped DMA buffer.

FIG. 4 illustrates a flowchart 400 of a prior-art method of transferring a packet from a protocol stack 405 to a network device driver 415, and from the network device driver 415 to a communications adapter 465. The protocol stack 405 requests from the network device driver 415 an interface-specific buffer (ISB), a form of pre-mapped DMA buffer (element 410). The network device driver 415 then returns an ISB (ISB 420) to the protocol stack 405. The protocol stack 405 then hands down the packet to the network device driver 415 (element 425). The packet is stored in two linked buffers, a non-ISB buffer 430 to store the header and the mapped ISB buffer 420. The network device driver 415 copies the header to mapped buffer 445 (element 440). Then, in separate operations, mapped buffer 445 and mapped ISB buffer 420 are DMAed to the communications adapter 465 (elements 455 and 460, respectively).

BRIEF SUMMARY

A method and arrangement of data communications is presented. One embodiment provides a method of data communications. The embodiment may involve receiving from a protocol stack a request for a buffer to hold data. The data may consist of all or part of a payload of a packet. The embodiment may also involve allocating space in a buffer for the data and for a header of a packet. The protocol stack may store the data in a portion of the buffer and hand down the buffer to a network device driver. The embodiment may also involve the network device driver transferring the entire packet from the buffer to a communications adapter in a single direct memory access (DMA) operation.

DETAILED DESCRIPTION

The following is a detailed description of embodiments of the invention depicted in the accompanying drawings. The embodiments are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods and arrangements of performing data communications are represented. One embodiment provides a method of data communications. The embodiment may involve receiving from a protocol stack a request for a buffer to hold data. The data may consist of all or part of a payload of a packet. The embodiment may also involve allocating space in a buffer for the data and for a header of a packet. The protocol stack may store the data in a portion of the buffer and hand down the buffer to a network device driver. The embodiment may also involve storing a header of the packet in another portion of the buffer. The embodiment may also involve the network device driver transferring the entire packet from the buffer to a communications adapter in a single direct memory access (DMA) operation. In many embodiments, the buffer may be a pre-mapped buffer. In further embodiments, the buffer may be an interface-specific buffer.

In further embodiments, a network device driver may create memory at the beginning of the buffer that is unknown to the protocol stack (hidden memory). The amount of space may be user configured or dynamically determined by the network device driver. The protocol stack may write the payload in the buffer and the header in another buffer and may hand down the linked buffers to the network device driver. The network device driver may copy the header from the other buffer to the hidden memory. Then network device driver may then transfer the contents of the buffer to the communications adapter in a single DMA operation.

In other further embodiments, the protocol stack may write the headers to the beginning of the buffer. In these embodiments, the device driver avoids copying the header information. In further embodiments, the network device driver may modify the buffer descriptor to move the data pointer down to leave room for the headers and may indicate to the protocol stack that the buffer size is sufficient only for writing the payload. The protocol stack may write the payload to the end of the buffer, discover that leading space is available in the buffer, and write header information in the leading space, moving up the data pointer. As a result, the network device driver may receive a packet in a single pre-mapped buffer and may transfer the contents to the communications adapter in a single DMA operation.

Figure 1:
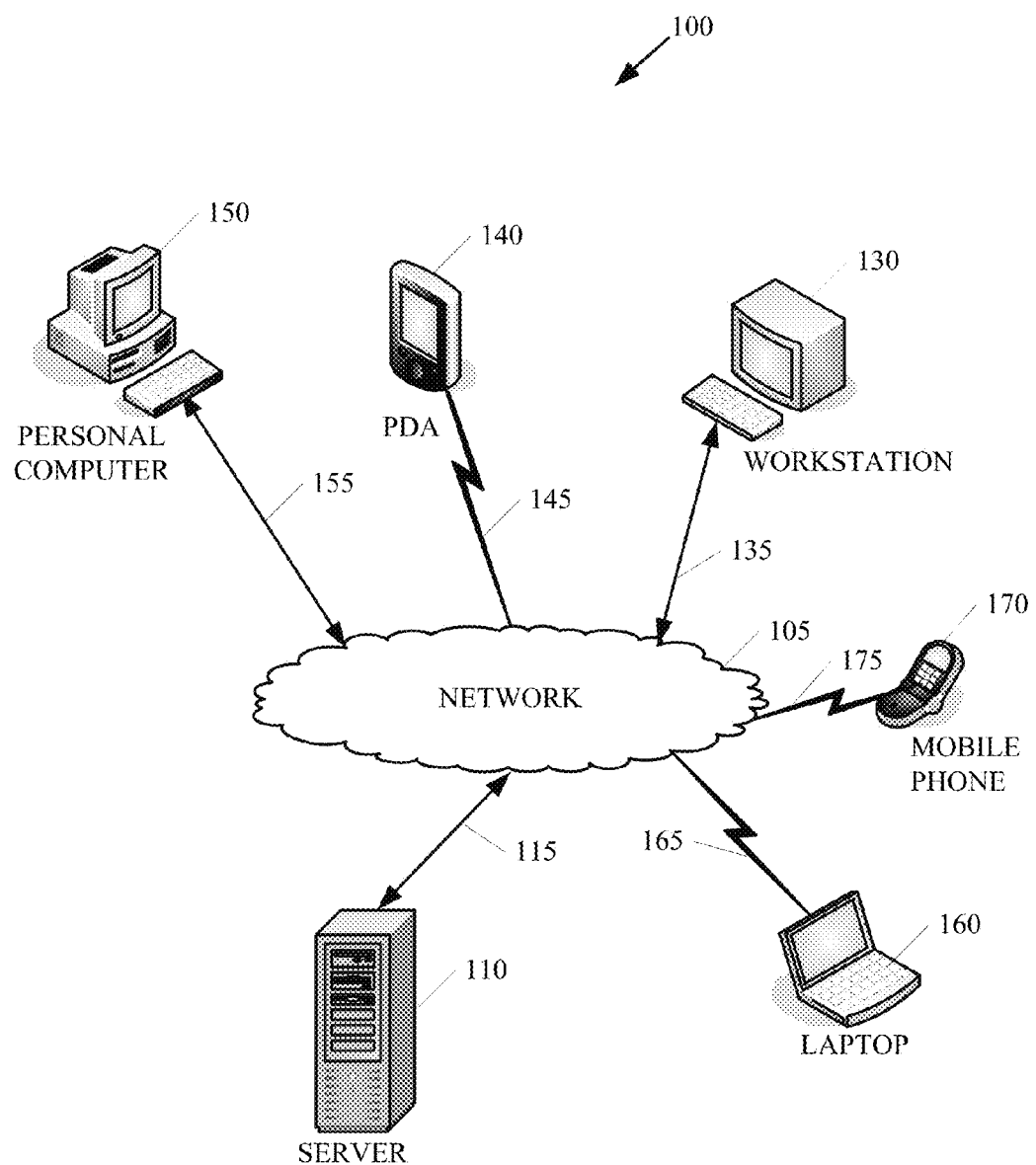
FIG. 1 depicts an embodiment of a networked system of devices capable of data communications in accordance with embodiments of the invention.

FIG. 1 depicts a diagram of an embodiment of a networked system 100 of devices. The system 100 includes a network 105, server 110 connected to network 105 through wireline connections 115, and a variety of other devices connected to a network (hosts), including:

- workstation 130, a computer coupled to network 105 through wireline connection 135,
- personal digital assistant 140, coupled to network 105 through wireless connection 145,
- personal computer 150, coupled to network 105 through wireline connection 155,
- laptop computer 160, coupled to network 105 through wireless connection 165; and
- mobile phone 170, coupled to network 105 through wireless connection 175.

The listing of devices is for illustration and not limitations. Other embodiments of the invention may be carried out by other devices, such as netbooks and mobile internet devices.

Network 105, which may consist of the Internet or another wide area network, a local area network, or a combination of networks, may provide data communications among server 110 and the hosts 130, 140, 150, 160, and 170. Server 110 may have installed and operative upon it software to respond to requests from a client over a network. Examples include web servers which may generate content and communicate with visitors to web sites and communications servers which may receive requests to transmit or deliver messages over the network.

Pursuant to a variety of communications protocols, applications running in hosts 130, 140, 150, 160, and 170 may communicate over network 105 with applications in other hosts or in server 110. In transmitting data, an application program such as e-mail or a web browser may hand data to the protocol stack, A series of programs in the devices to implement the protocols. The top layer of the protocol stack may subdivide the data into small pieces to comply with rules about maximum size for a transmission. Then, each layer may add headers to the data to produce packets, the data structures that are transmitted over the network.

Each layer of the protocol stack may receive data from a higher layer, process the data, typically by adding a header, and hand the data down to a lower layer. The headers may include such information as the source and destination address, the type of communications protocol, the encoding of the data, information as to how to reassemble the packets, such as a packet number, and error-checking information. The bottom layer may hand the packets to a network device driver, which in turn may transfer them to a network adapter. The transfer may be in the form of direct memory access (DMA) operation. In a DMA operation, the communications adapter may read or write the host's memory without an involvement of a processor, other than to issue a command to begin the transfer. A DMA operation may thus consume fewer system resources than a read or write that requires continued processor involvement throughout the operation.

In passing the data from one layer to another, and from the bottom layer to the network device driver, the layers of the stack may avoid repeated copying. Instead, they may utilize a data structure that enables a layer to describe the location of the various pieces of a message, such as a linked-list of pointers to the portions of a message. The use of the data structure may enable the layers to manipulate the messages, such as by adding and stripping headers, assembling small pieces into a large message, or disassembling data into packets, without the need for copying. Copying may be an expensive operation. As a result, the network device layer may receive a packet in the form of multiple linked buffers.

The layers of the receiving network device may handle the transmission in reverse order. The network adapter of the receiving device may hand a packet to a device driver, which in turn hands it to the lowest layer of protocol. From there, the data is passed to higher layers and eventually to a receiving application, such as a server or a web browser. Each layer may examine a header or portion of a header, process the data in accordance with the information contained in the header, strip off the header or portion of the header, and pass the modified packet up to the next layer. The highest layer may reassemble the packets and transfer the data to an application.

In the embodiment of FIG. 1, the hosts may transmit a packet from the device driver to the communications adapter in a single DMA transfer. The protocol stack may request a buffer from the network device driver to store the payload. The network device driver may allocate space and provide a buffer with space for both the payload and a header. The protocol stack may store the payload in the buffer and hand down the buffer to the network device driver. Either the protocol stack or the network device driver may write the header in the extra space in the buffer. The network device driver may transfer the buffer, containing both the header and the payload, to the communications adapter in a single DMA transfer.

The arrangement of server 110 and hosts 130, 140, 150, 160, and 170 making up the exemplary system illustrated in FIG. 1 is for explanation, not for limitation. Data processing systems useful according to various embodiments of the present invention may omit a server, or may include additional servers, routers, other devices, and peer-to-peer architectures, not shown in FIG. 1, as will occur to those of skill in the art. Some embodiments may include additional servers to communicate with each other.

Networks in such data processing systems may support many data communications protocols, including for example TCP (Transmission Control Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
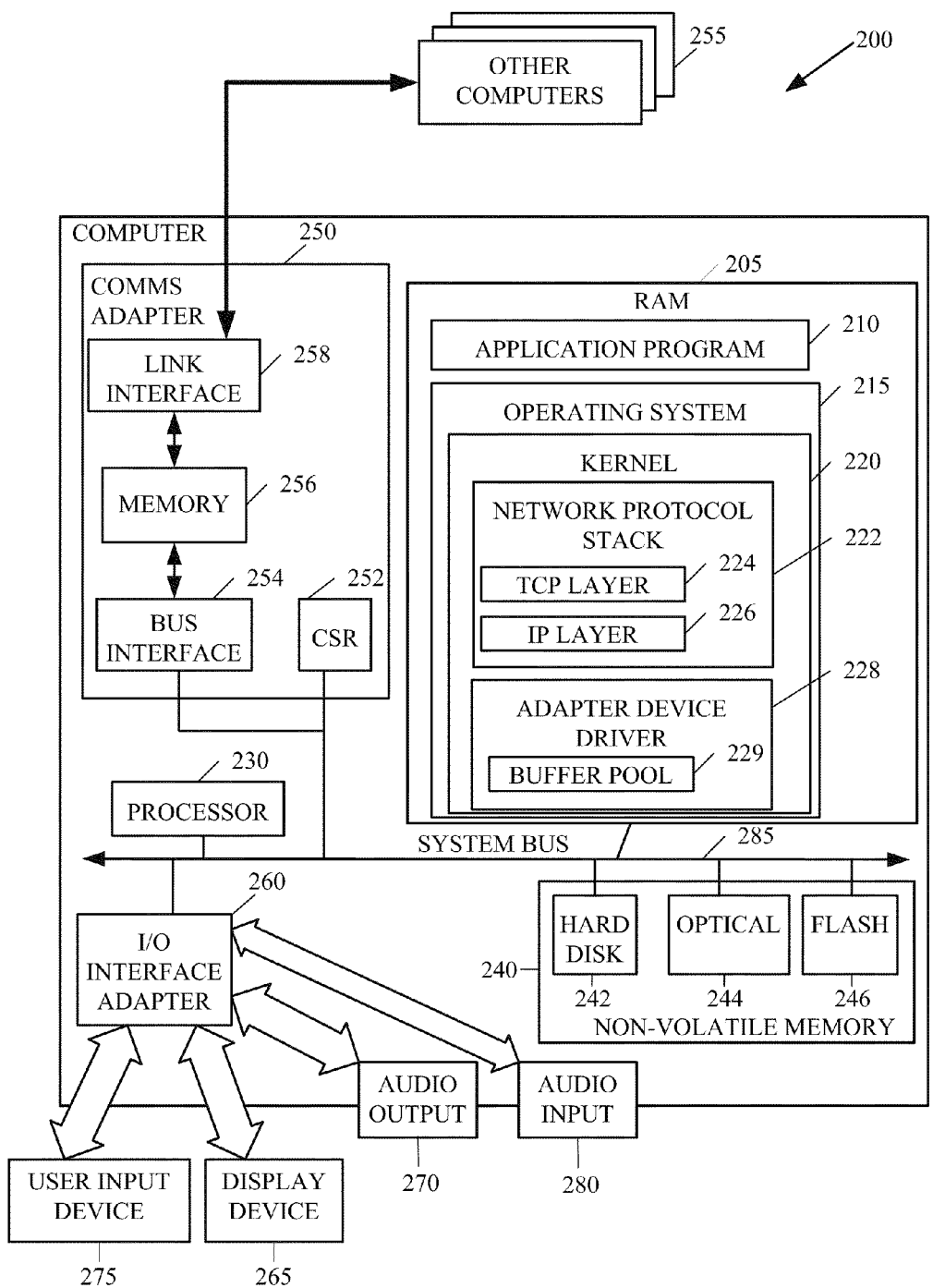
FIG. 2 depicts an embodiment of a computer capable of data communications in accordance with embodiments of the invention.

FIG. 2 depicts an embodiment of a computer 200 that may transfer a packet from a device driver to a communications adapter in a single DMA transfer in accordance with embodiments of the invention. Computer 200 includes random access memory (RAM) 205, a processor 230 or CPU, non-volatile memory 240, a communications adapter 250, and an Input/Output (I/O) interface adapter 260 connected by system bus 285. Stored in RAM 205 are application program 210 and operating system 215. Application program 210 may communicate over a network, such as network 105 of FIG. 1. Application program may have communications as its primary purpose, such as an email or instant message program or web browser; or may communicate over the network for special purposes, such as registering a user, receiving updates, or as part of a help feature.

Operating system 215 is a layer of system software that may make system resources, including memory, input/output resources, and processors, available to other programs. Operating system 215 may also control allocation and authorization for access to computer resources. Operating systems may perform low-level, basic tasks, such as recognizing input from a keyboard, sending output to a display screen, keeping track of files and directories on a magnetic disk drive, and controlling peripheral devices such as disk drives and printers. The operating system is also responsible for security, ensuring that unauthorized users do not access the system.

Operating systems useful in performing network communications include UNIX™, Linux™, Solaris™, Microsoft Windows XP™ and Vista™, AIX™, IBM's i5/OS™ and others as will occur to those of skill in the art.

Operating system 215 includes kernel 220. Kernel 220 provides the fundamental services of operating system 215, including network communications. The responsibilities of kernel 220 may include managing the system's resources (the communication between hardware and software components). Kernel 220 may provide the lowest-level abstraction layer for the resources (especially memory, processors and I/O devices) that application software must control to perform its function.

Kernel 220 includes the network protocol stack 222. For illustration, the protocol stack of FIG. 2 includes Transmission Control Protocol (TCP) layer 224 and Internet Protocol (IP) layer 226. TCP is a standard transport-level protocol that utilizes reliable connections. A transport-level protocol may provide communications between processes on different hosts. A reliable connection is a connection that provides some protection against missing or corrupt packets. Bytes of data are divided into packets called segments. The bytes are numbered sequentially. The recipient of a message may send an acknowledgement informing the sender the next segment expected. For example, if a node (network device) receives a segment containing bytes 0 through 49, may transmit an ACK referring to byte 50. If the sender fails to receive an acknowledgement for a segment, it may retransmit the segment. Many application protocols use TCP, including SMTP (simple mail transfer protocol); HTTP, used for the web; POP3, for email retrieval; Telnet, and FTP.

IP layer 226 may enclose packet in an IP datagram, add the datagram header and trailer, decide where to send the datagram, and pass the datagram on to the Network Interface layer. By looking at the IP address of the destination, IP layer 226 may decide whether to send the datagram directly to the final destination or else to a gateway, an intermediate host, for further forwarding.

Kernel 220 also includes adapter device driver 228. Adapter device driver 228 is software that may control the operation of communications adapter 250. It may translate between instructions from operating system 215 and operations of communications adapter 250, and may pass data back and forth between communications adapter 250 and network protocol stack 222. Adapter device driver 228 includes buffer pool 229. These buffers may be premapped, so that data can be transferred between operating system 215 and communications adapter 250 in a direct memory access (DMA) operation. In a DMA operation, the communications adapter 250 may read or write the host's memory without continued involvement of processor 230. A DMA operation may thus consume fewer system resources than a read or write that requires use of processor 230.

The modules shown in RAM 205 are for explanation, not for limitation. In other embodiments, modules other than an operating system kernel may provide for network communications. Application program 210 and operating system 215 are shown in RAM 205 in FIG. 2, but many components of such software may be stored in non-volatile memory 240 also. Further, while the components of such are shown simultaneously present in RAM, in some other embodiments, only some of the components of RAM 205 may be present at any given time.

Non-volatile computer memory 240 may be implemented as a hard disk drive 242, optical disk drive 244, electrically erasable programmable read-only memory space (EEPROM or Flash memory) 246, RAM drives (not shown), or as any other kind of computer memory as will occur to those of skill in the art.

Communications adapter 250 may implement the hardware level of data communications through which one computer sends data communications to other computers, such as other computers 255, directly or through a network. Communications adapter 250 may provide an interface to operating system 215 and other modules utilizing it. The interface may specify the form in which data is to be passed to the communications adapter, and the form in which data is received from the communications adapter. Examples of communications adapters include modems for wired dial-up communications, Ethernet (IEEE 802.3) adapters for wired network communications, 802.21a/b/g/n adapters for wireless network communications, and mobile broadband cards.

Communications adapter 250 includes bus interface 254 which sends and receives data over system bus 285. It also includes link interface 258, which sends and receives data over a communications link, such as an Ethernet connection, a telephone line, or a fibre-optic cable. Data may pass from either interface through memory 256 to the other interface. Communications adapter 252 also includes a control status register (CSR) 252. Adapter device driver may write to CSR 252 to provide instructions to communications adapter 250 and may read from CSR 252 to determine the state of communications adapter 250.

I/O interface adapter 260 implements user-oriented I/O through, for example, software drivers and computer hardware for controlling output to display devices such as display device 265 and audio output device 270 as well as user input from user input device 275 and audio input device 280. User input device 275 may include both a keyboard and a mouse. Some embodiments may include other user input devices such as speech interpreters, bar code scanners, text scanners, tablets, touch screens, and/or other forms of user input devices. Audio output 270 may include speakers or headphones and audio input device 280 may include a microphone or other device to capture sound.

The computer and components illustrated in FIG. 2 are for explanation, not for limitation. In other embodiments, embedded systems, PDAs, cell phones, BlackBerries®, netbooks, mobile Internet devices, and other devices may transfer packets from a device driver to a communications adapter in a single DMA operation in accordance with embodiments of the invention. In other embodiments, modules to provide network communications may be implemented in hardware, firmware, or in state machines or may form a component of an application program. In several embodiments, a computing device may contain two or more processors. In various embodiments, a computing device may use point-to-point interconnects to connect processors or to connect a processor and another element of the computing system.

Figure 3:
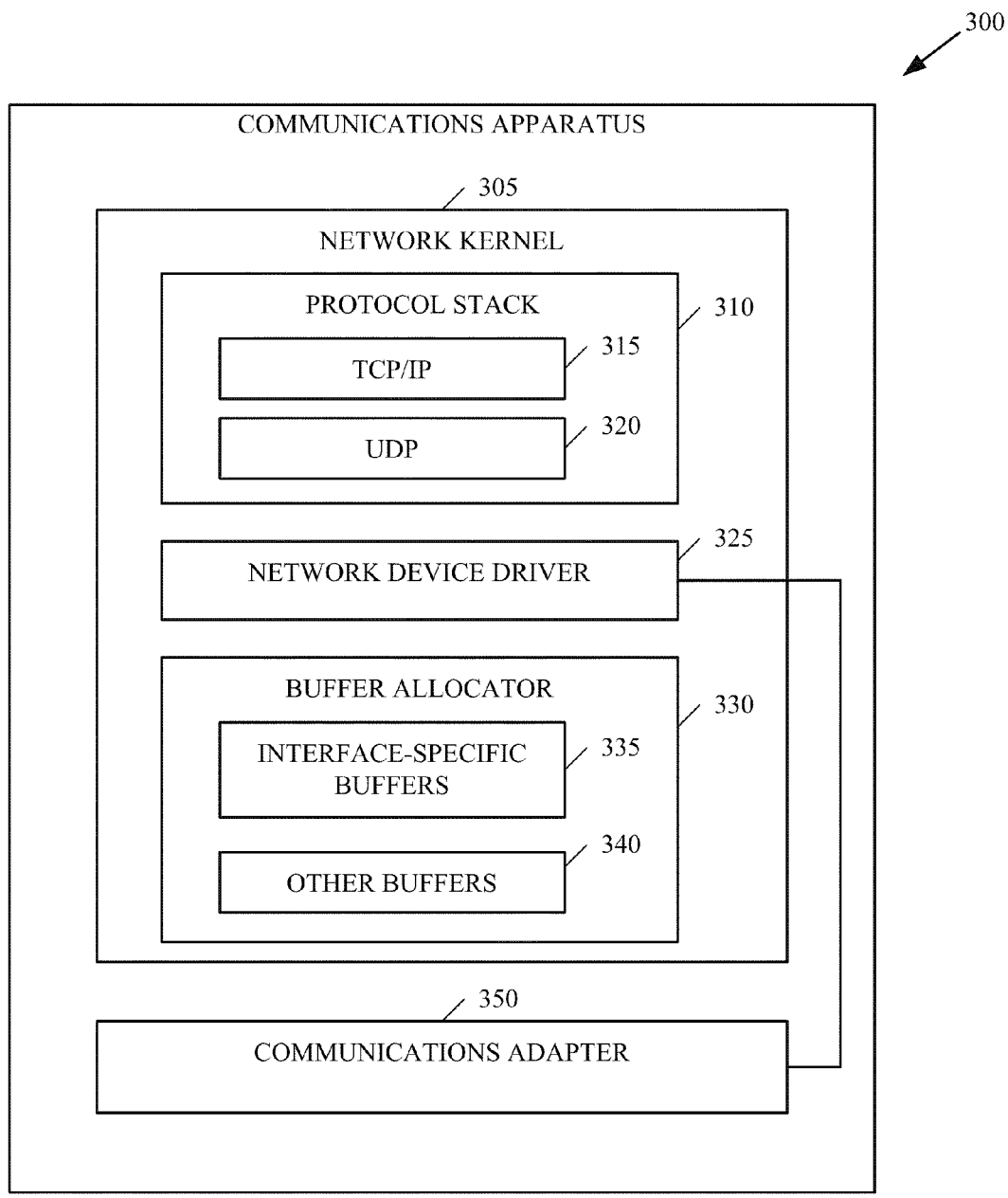
FIG. 3 depicts an embodiment of an apparatus to perform data communications in accordance with embodiments of the invention.

Turning to FIG. 3, disclosed is a block diagram illustrating an exemplary communications apparatus 300 to perform communications over a network. Communications apparatus 300 includes network kernel 305. Network kernel 305 handles the communications tasks of an operating system kernel. Network kernel 305 includes protocol stack 310, a layer of programs to process data to be send over a network. It includes TCP/IP 315, programs which process data under the TCP and IP protocols. Protocol stack 310 also includes User Datagram Protocol (UDP) module 320. The UDP transport protocol provides a best-effort connectionless process-to-process communication service. The protocol permits multiple processes on a host to share a network.

Network kernel 305 also includes network device driver 325. Device driver 325 provides an interface between the protocol stack and communications adapter 350. It may receive instructions from network kernel 305 and translate them into instructions for communications adapter 350. It may also translate data between protocol stack 310 and communications adapter 350.

Communications adapter 350 may provide an interface between a host, such as the devices of FIG. 1, and a physical communications link, such as an Ethernet connection.

Figure 5:
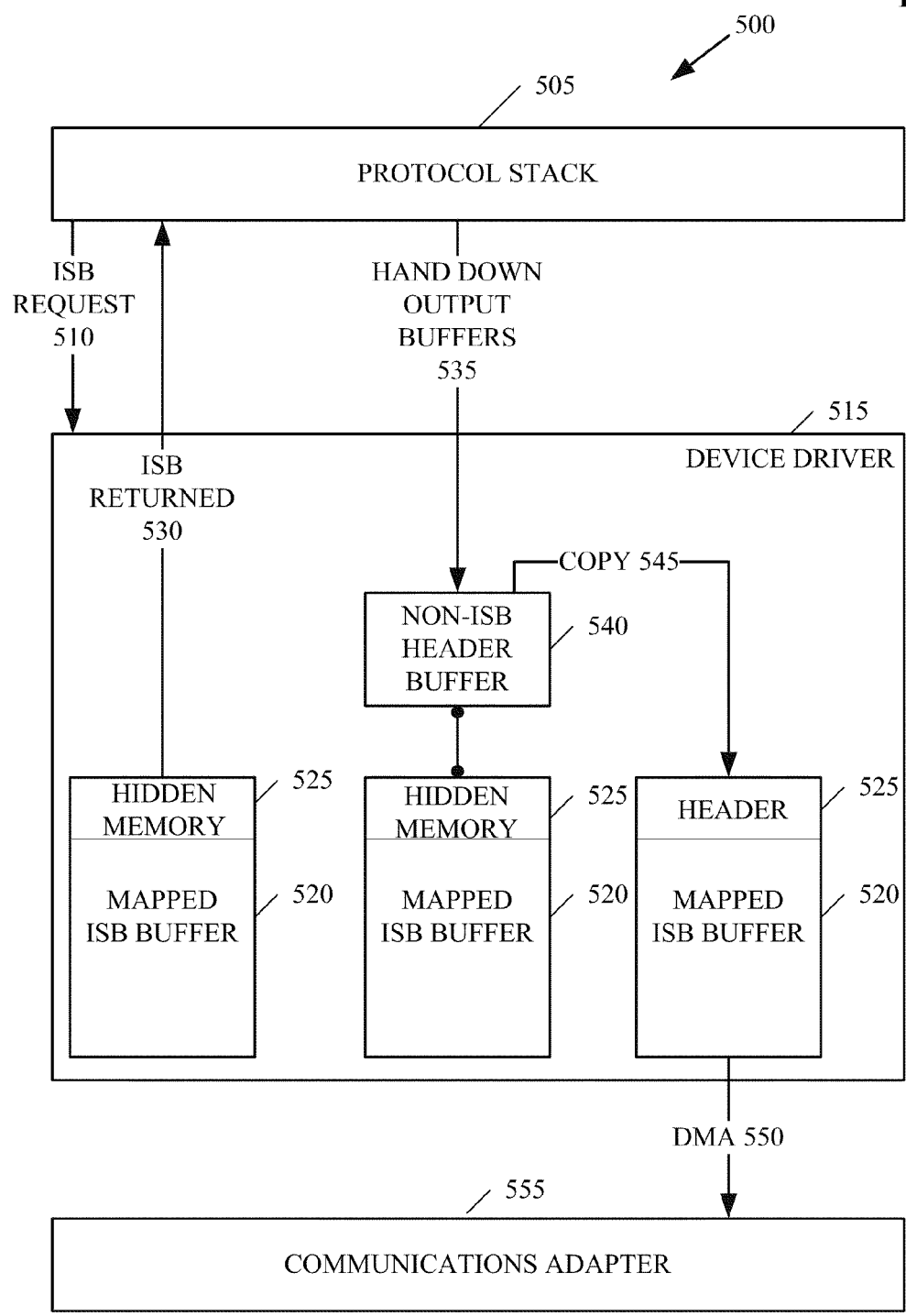
FIG. 5 depicts a flowchart of an embodiment of a method to transfer a packet from the protocol stack to a communications adapter in accordance with embodiments of the invention.

FIG. 5 illustrates a flowchart 500 of a method of transferring a packet from a network device driver 515 to a communications adapter 555 in a single DMA transfer. In flowchart 500, when protocol stack 505 requests a pre-mapped buffer from network device driver 515, it supplies a buffer with hidden memory. The extra space can later be used to store one or more headers.

In flowchart 500, the protocol stack 505 requests from the network device driver 515 an interface-specific buffer (ISB), a form of pre-mapped DMA buffer (element 510). The request may specify the amount of space needed. Protocol stack 505 may wish to store all or a portion of the payload of a packet, and the request may specify the size of the payload or portion of the payload.

The network device driver 515 then returns ISB 520 to the protocol stack 505 (element 530). ISB 520 contains memory 525 hidden from the protocol stack 505; that is, the description of ISB 520 provided to protocol stack 505 may not describe all of the space available. Hidden memory 525 may lie at the beginning of the buffer. The buffer may include consecutive locations in storage, and network device driver 515 may describe ISB 520 to protocol stack 505 as starting at an address beyond the addresses of hidden memory 525. ISB 520 may be one buffer in a pool or collection of pre-mapped buffers. Network device driver 515 may allocate one or more ISB pools and modify the buffer descriptors to hide a fixed amount of memory at the beginning of the buffer from the layers of protocol stack 505.

The amount of memory hidden may be either user configured. The user may specify an amount of space to hold headers of the protocols most commonly used, such as TCP/IP headers. The user may select an amount to cover a worst-case scenario, or an amount that usually provides enough space. Alternatively, the network device driver 515 may determine the space. In one embodiment, the network device driver 515 may dynamically determine an amount of space. It may begin by choosing a value sufficient to handle the most common protocols used on the host, or by choosing a minimum value. If the space is insufficient to put the header or headers of a packet in the hidden space, the network device driver 515 may copy the header or headers to another buffer and DMA the contents to the network adapter in multiple operations. For future buffer requests from protocol stack 505, the network device driver 515 may increase the amount of hidden memory. In further embodiments, the network device driver 515 may compare space requirements and hidden space allocation. If the hidden space is generally larger than necessary, network device driver 515 may reduce the allocation of hidden space.

After receiving the mapped ISB buffer 520, protocol stack 505 may create a linked data structure. It may write all or a portion of the payload of a packet in mapped ISB buffer 520, and may write headers in non-ISB header buffer 540. Protocol stack 505 may hand down the data structure to network device driver 515 (element 535). Handing down a data structure is specifying how it may be accessed, such as providing a pointer to the address of the data structure and the length of the data. When hidden memory 525 is large enough to hold the headers, network device driver 515 may copy the contents of non-ISB header buffer 540 into hidden memory 525 (element 545). Network device driver 515 may then DMA the contents of mapped ISB buffer to communications adapter 555 in a single DMA transfer (element 550).

The method of FIG. 5 is for illustration and not limitation. In other embodiments, a protocol stack may add multiple headers to the payload. For example, a UDP layer and an IP layer may each add their own headers. In that case, the top layer of the protocol stack may request a buffer, and may hand it down to the lower layers of the protocol stack. The lower layers may add headers in a linked list or other form of storage. The network device driver may receive a data structure with multiple, linked headers and may copy each of them to the hidden memory. In many embodiments, the protocol layers may hand down multiple packets and the network device driver may allocate multiple buffers for them.

Figure 4:
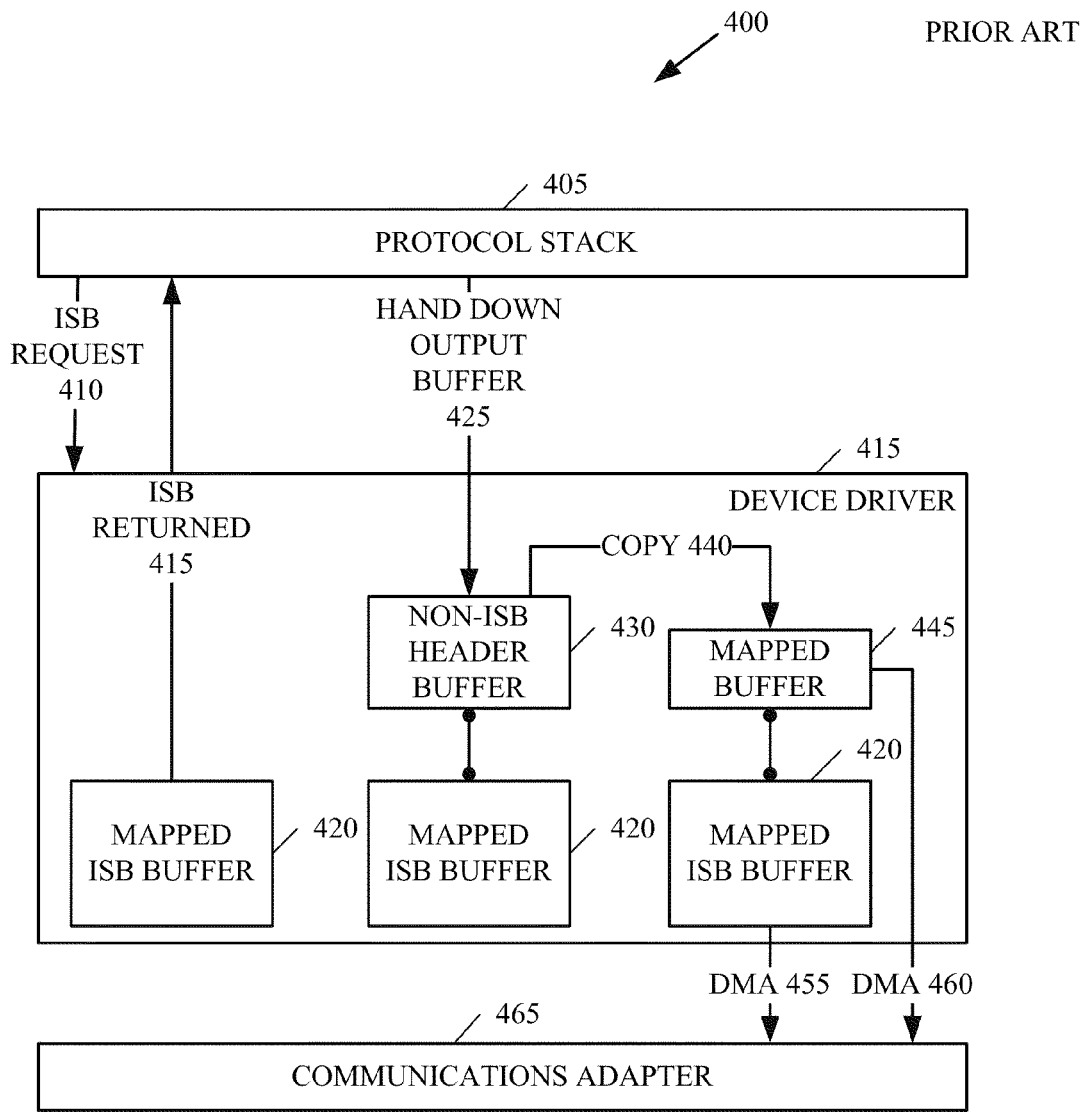
FIG. 4 depicts a flowchart of a prior art method to transfer a packet from the protocol stack to a communications adapter.

In comparison to the prior art of FIG. 4, the method of FIG. 5 saves a DMA operation. In both methods, the protocol stack requested a buffer and was allocated one. In both, the protocol stack handed down a data structure with a portion of the packet in the allocated buffer and another portion in a separate buffer. In both methods, the network device driver copied the header buffer to a mapped buffer. In FIG. 4, however, the copying was to a separate buffer, and transferring the contents of the two buffers to the communications adapter required two DMA operations. In FIG. 5, the copying was to the front of the buffer holding the payload, and transferring the contents required a single DMA operation.

The method of FIG. 5 only requires modifying the network device driver. The protocol stack may remain unchanged. The protocol stack was not required to act based upon knowledge of the hidden memory.

Figure 6:
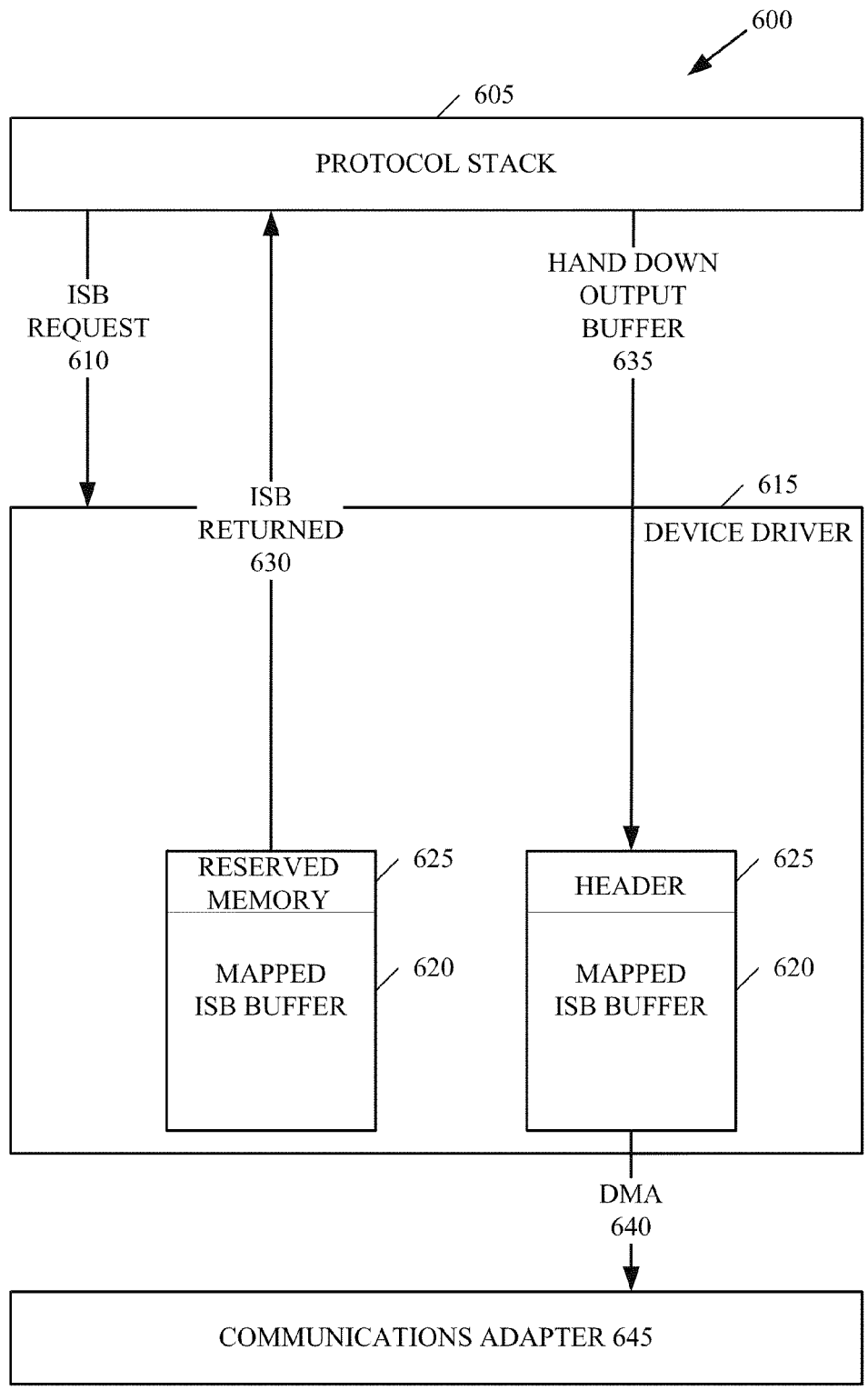
FIG. 6 depicts another flowchart of an embodiment of a method to transfer a packet from the protocol stack to a communications adapter in accordance with embodiments of the invention.

Turning to FIG. 6, illustrated is a flowchart 600 of another method of transferring a packet from a network device driver 615 to a communications adapter 655 in a single DMA transfer. In the method of FIG. 6, when protocol stack 605 requests a pre-mapped buffer to store all or a portion of a payload of a packet, it again receives a buffer with additional space. In the method of FIG. 6, however, protocol stack 605 is aware of the space, and stores the header information there. As a result, there is no need to copy the header information from one buffer to another.

In flowchart 600, the protocol stack 605 requests from the network device driver 615 an interface-specific buffer (ISB) (element 610) to store all or a portion of the contents of a packet. The request may specify an amount of space to be provided to store the contents, and may include space for the headers.

In response to the request, the network device driver 615 returns ISB 620 to the protocol stack 605 (element 630). ISB 620 contains reserved memory 625, which may lie at the beginning of the buffer. The amount of memory reserved may be user configured or dynamically determined by the network device driver 615. ISB 620 may contain sufficient space for the entire packet, including headers and payload. ISB 620 may be one buffer in a pool or collection of pre-mapped buffers.

The protocol stack 605 may write the payload below the reserved memory 625 to leave room at the front of the buffer for the header. The network device driver 615 may modify the buffer descriptor to move the data pointer down to leave room for the headers and may indicate to the protocol stack 605 that the buffer size is sufficient only for writing the payload. The protocol stack may write the payload at the end of the buffer. Typically, when a protocol stack requests an ISB buffer, it uses whatever size buffer is returned by the network device driver even if the buffer is smaller than the requested size. Thus, even if protocol stack 605 requested a buffer sufficient to hold both the header and payload, it would attempt to write the payload in mapped ISB buffer 620.

In addition, the protocol stack 605 can be modified to check for leading space in buffers. Then, when the protocol stack 605 writes headers for the packet, it will notice the space available in reserved memory 625. Each layer may write a header in the reserved memory 625 and move the data pointer up. The end result is the protocol stack 605 may store the entire packet in mapped ISB 620. Although protocol stack 605 may be modified, however, there is no need to modify the protocol stacks in the hosts communicating with protocol stack 605. Externally, the packets still conform to the same communications as before.

Protocol stack 605 may hand down mapped ISB 620 to network device driver 615 (element 635). Network device driver 615 may then DMA the contents of mapped ISB buffer 620 to communications adapter 645 in a single DMA transfer (element 650).

The method of FIG. 6 is for illustration and not limitation. In other embodiments, a protocol stack may add multiple headers to the payload. For example, a UDP layer and an IP layer may each add their own headers. In that case, the top layer of the protocol stack may request a buffer, and may hand it down to the lower layers of the protocol stack. The lower layers may add headers in a linked list or other form of storage. The network device driver may receive a data structure with multiple, linked headers and may copy each of them to the hidden memory. In many embodiments, the protocol layers may hand down multiple packets and the network device driver may allocate multiple buffers for them. In some embodiments, the device driver may not be aware of the reserved space. The protocol stack may simply request sufficient space for the entire packet, instead of requesting space only for the payload.

In some embodiments of FIG. 6, it may not be necessary to modify the device driver. Instead, the device driver may receive the mapped ISB buffer with the reserved space from another module, such as the network kernel. In these embodiments, the device driver may be unaware of the reserved space.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be apparent to those skilled in the art having the benefit of this disclosure that the present invention contemplates methods and arrangements for transferring packets from a device driver to a communications adapter in a single DMA operation. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of data communications, the method comprising:
    receiving from a protocol stack a request for a buffer to hold data, the data consisting of all or a portion of a payload of a packet;
    allocating space in the buffer for the data and for a header of the packet, the allocating in response to the request;
    storing the data in a portion of the buffer, the storing by the protocol stack;
    storing the header of the packet in another portion of the buffer, wherein storing the data and the header comprises:
        moving down a pointer to a location in the buffer;
        storing the data in the buffer beginning at the location designated by the pointer; and
        storing the header in a portion of the buffer above the location designated by the pointer;
    handing down the buffer from the protocol stack to a network device driver; and
    transferring the entire packet from the buffer to a communications adapter in a single direct memory access (DMA) operation.

2. The method of claim 1, wherein the allocating comprises allocating space in a premapped buffer.

3. The method of claim 2, wherein the allocating is allocating in an interface-specific buffer.

4. The method of claim 1, wherein storing the header comprises:
    receiving by the network device driver the header from the protocol stack in a separate buffer; and
    copying by the network device driver the header from the separate buffer to the other portion of the buffer.

5. The method of claim 4, wherein the allocating comprises allocating a fixed amount of memory at the beginning of the buffer for the header.

6. The method of claim 5, wherein the allocating comprises allocating a user-configured amount of space at the beginning of the buffer for the header.

7. The method of claim 5, wherein the allocating comprises dynamically determining an allocation of space at the beginning of the buffer for the header.

8. The method of claim 1, wherein:
storing the header comprises storing by the protocol stack the header in the other portion of the buffer; and
handing down the buffer comprises handing down the buffer from the protocol stack to the network device driver, the buffer containing the data and the header.

9. An apparatus for data communications, the apparatus comprising:
one or more processors;
a network device driver to:
  receive from a protocol stack a request for a buffer to hold data, the data consisting of all or a portion of a payload of a packet;
  allocate space in a pre-mapped buffer for the data and for a header of a packet, the allocating in response to the request;
  move down a pointer to a location in the pre-mapped buffer;
  return the pre-mapped buffer to the protocol stack; and
  transfer the pre-mapped buffer to a communications adapter in a single direct memory access (DMA) operation, wherein the pre-mapped buffer contains the entire packet, including the header of the packet; and
the protocol stack to:
  store the data in a portion of the pre-mapped buffer beginning at the location designated by the pointer;
  store the header in a portion of the buffer above the location designated by the pointer; and
  hand down the pre-mapped buffer to the network device driver, the pre-mapped buffer containing the data.

10. The apparatus of claim 9, wherein the network device driver is to receive the header from the protocol stack in a separate buffer and to copy the header from the separate buffer to the other portion of the buffer.

11. A computer program product for data communications, the computer program product comprising:
a non-transitory computer readable storage medium having computer usable program code stored thereon, the computer usable program code comprising:
computer usable program code configured to receive from a protocol stack a request for a buffer to hold data, the data consisting of all or a portion of a payload of a packet;
computer usable program code configured to allocate space in the buffer for the data and for a header of the packet, the allocating in response to the request;
computer usable program code configured to store the data in a portion of the buffer, the storing by the protocol stack;
computer usable program code configured to store the header of the packet in another portion of the buffer, wherein the computer usable program code configured to store the data and the header comprises:
  computer usable program code configured to move down a pointer to a location in the buffer;
  computer usable program code configured to store the data in the buffer beginning at the location designated by the pointer; and
  computer usable program code configured to store the header in a portion of the buffer above the location designated by the pointer;
computer usable program code configured to hand down the buffer from the protocol stack to a network device driver; and
computer usable program code configured to transfer the entire packet from the buffer to a communications adapter in a single direct memory access (DMA) operation.

12. The computer program product of claim 11, wherein the computer usable program code configured to allocate space in a buffer comprises computer usable program code configured to allocate space in a premapped buffer.

13. The computer program product of claim 11, wherein the computer usable program code configured to store the header comprises:
computer usable program code configured to receive by the network device driver the header from the protocol stack in a separate buffer; and
computer usable program code configured to copying by the network device driver the header from the separate buffer to the other portion of the buffer.

14. The computer program product of claim 13, wherein the computer usable program code configured to allocate comprises computer usable program code configured to allocate a fixed amount of memory at the beginning of the buffer for the header.

15. The computer program product of claim 14, wherein the computer usable program code configured to allocate comprises computer usable program code configured to allocate a user-configured amount of space at the beginning of the buffer for the header.

16. The computer program product of claim 14, wherein the computer usable program code configured to allocate comprises computer usable program code configured to dynamically determining an allocation of space at the beginning of the buffer for the header.

17. The computer program product of claim 11, wherein:
the computer usable program code configured to store the header comprises
computer usable program code configured for the protocol stack to store the header in the other portion of the buffer; and
the computer usable program code configured to hand down the buffer comprises computer usable program code configured to hand down the buffer from the protocol stack to the network device driver, the buffer containing the data and the header.

* * * * *